US006807161B2

(12) United States Patent
Bender et al.

(10) Patent No.: US 6,807,161 B2
(45) Date of Patent: *Oct. 19, 2004

(54) METHOD AND APPARATUS FOR SIGNAL COMBINING IN A HIGH DATA RATE COMMUNICATION SYSTEM

(75) Inventors: Paul E. Bender, San Diego, CA (US); Matthew S. Grob, La Jolla, CA (US); Gadi Karmi, San Diego, CA (US); Roberto Padovani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/300,392

(22) Filed: Nov. 19, 2002

(65) Prior Publication Data

US 2003/0076795 A1 Apr. 24, 2003

Related U.S. Application Data

(62) Division of application No. 09/346,882, filed on Jul. 2, 1999, now Pat. No. 6,556,549.

(51) Int. Cl.[7] .............................................. H04Q 7/00
(52) U.S. Cl. ...................... 370/332; 370/347; 370/328
(58) Field of Search ................................. 370/332–336; 335/209, 338, 328, 347; 455/528; 375/146–150, 200–222, 309, 144, 347, 367, 142

(56) References Cited

U.S. PATENT DOCUMENTS

| | | | |
|---|---|---|---|
| 3,351,859 A | 11/1967 | Groth, Jr. et al. .............. 325/42 |
| 4,112,257 A | 9/1978 | Frost .............................. 179/2 |
| 4,222,115 A | 9/1980 | Cooper et al. .................. 375/1 |
| 4,291,410 A | 9/1981 | Caples et al. .................. 375/1 |
| 4,630,283 A | 12/1986 | Schiff ............................. 375/1 |
| 4,669,091 A | 5/1987 | Nossen .......................... 375/14 |
| 4,672,658 A | 6/1987 | Kavehrad et al. ............. 379/63 |
| 4,694,467 A | 9/1987 | Mui ............................... 375/1 |
| 4,710,944 A | 12/1987 | Nossen .......................... 375/40 |
| 4,736,460 A | 4/1988 | Rilling ....................... 455/283 |
| 4,752,969 A | 6/1988 | Rilling ....................... 455/278 |
| 4,765,753 A | 8/1988 | Schmidt ....................... 379/60 |
| 4,797,950 A | 1/1989 | Rilling ....................... 455/276 |
| 5,038,399 A | 8/1991 | Bruckert ....................... 455/33 |
| 5,093,924 A | 3/1992 | Toshiyuki et al. ............. 455/33 |
| 5,109,390 A | 4/1992 | Gilhousen et al. ............. 375/1 |
| 5,297,192 A | 3/1994 | Gerszberg ..................... 379/59 |

(List continued on next page.)

FOREIGN PATENT DOCUMENTS

| | | |
|---|---|---|
| EP | 0779755 | 6/1997 |
| GB | 2336740 | 10/1999 |
| WO | 9222162 | 12/1992 |
| WO | 9500821 | 1/1995 |
| WO | 9610320 | 4/1996 |
| WO | 9909779 | 2/1999 |

*Primary Examiner*—Chi Pham
(74) *Attorney, Agent, or Firm*—Philip Wadsworth; Sandra L. Codsey; Albert J. Harnois

(57) ABSTRACT

Reverse link busy bits are independently generated by each base station and indicate whether a base station has reached a reverse link capacity limit. A remote station combines multipath components of the reverse link busy bits in its Active Set and in response transmits a reverse link signal only when all of the reverse link busy bits indicate that the base stations in the Active Set have reverse link capacity. In an embodiment, the remote station weights the reverse link busy signals in accordance with the signal strength of the transmitting base station and determines whether to transmit based on the weighted sum of the busy signals. In an embodiment, the remote station weights the reverse link busy signals in accordance with the signal strength of the transmitting base station and determines a maximum reverse link data rate based on the weighted sum of the busy signals.

68 Claims, 10 Drawing Sheets

U.S. PATENT DOCUMENTS

| | | | |
|---|---|---|---|
| 5,404,376 A | 4/1995 | Dent | 375/200 |
| 5,442,625 A | 8/1995 | Gitlin et al. | 370/18 |
| 5,491,837 A | 2/1996 | Haartsen | 455/62 |
| 5,535,239 A | 7/1996 | Padovani et al. | 375/205 |
| 5,594,720 A | 1/1997 | Papadopoulos et al. | 370/330 |
| 5,638,412 A | 6/1997 | Blakeney, II et al. | 375/377 |
| 5,710,974 A | 1/1998 | Granlund et al. | 455/33.2 |
| 5,734,647 A | 3/1998 | Yoshida et al. | 370/335 |
| 5,774,809 A | 6/1998 | Tuutijarvi et al. | 455/437 |
| 5,799,254 A * | 8/1998 | Karmi et al. | 455/528 |
| 5,822,359 A | 10/1998 | Bruckert et al. | 375/200 |
| 5,832,368 A | 11/1998 | Nakano et al. | 455/63 |
| 5,878,038 A | 3/1999 | Willey | 370/335 |
| 5,978,657 A | 11/1999 | Suzuki | 455/54.2 |
| 6,147,964 A * | 11/2000 | Black et al. | 370/209 |
| 6,556,549 B1 * | 4/2003 | Bender et al. | 370/328 |

* cited by examiner

METHOD AND APPARATUS FOR SIGNAL COMBINING IN A HIGH DATA RATE COMMUNICATION SYSTEM

CLAIM OF PRIORITY UNDER 35 U.S.C. §120

The present Application for Patent is a Divisional Application and claims priority to the allowed patent application Ser. No. 09/346,882 entitled "METHOD AND APPARATUS FOR SIGNAL COMBINING IN A HIGH DATA RATE COMMUNICATION SYSTEM" filed Jul. 2, 1999, now U.S. Pat. No. 6,556,549, issued on Apr. 29, 2003 to Bender et al., and assigned to the assignee hereof and hereby expressly incorporated by reference herein.

BACKGROUND

I. Field of the Invention

The present invention relates to communications. More particularly, the present invention relates to a novel and improved method and apparatus for performing signal combining during soft handoff in a wireless communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM," assigned to the assignee of the present invention, of which the disclosure thereof is incorporated by reference herein.

There has been an increasing demand for wireless communications systems to be able to transmit digital information at high rates. One method for sending high rate digital data from a remote station to a central base station is to allow the remote station to send the data using spread spectrum techniques of CDMA. One method that is proposed is to allow the remote station to transmit its information using a small set of orthogonal channels, this method is described in detail in U.S. Pat. No. 6,396,804, entitled "HIGH DATA RATE CDMA WIRELESS COMMUNICATION SYSTEM," assigned to the assignee of the present invention and incorporated by reference herein.

SUMMARY OF THE INVENTION

The present invention is a novel and improved method and apparatus describing the combining of signals in a high rate wireless communication system. In the exemplary embodiment, each base station in communication with a remote station transmits forward link data including traffic data, pilot symbols and overhead data. In the exemplary embodiment, the overhead data includes a reverse link busy bit, reverse link power control (RPC) commands and a forward link activity (FAC) bit. The reverse link busy bit indicates when the base station has reached its reverse link capacity limit. The RPC bit indicates to each mobile station in communication with the base station whether their transmission energy should be increased or decreased. The FAC bit is a message that indicates when a base station will have no forward link data to transmit a predetermined number of slots in the future.

In the exemplary embodiment of the present invention, the forward link traffic is only transmitted from one base station to a given remote station. Thus, there is no soft handoff of the forward link traffic data. The multipath components of the forward link traffic data are combined using a traditional RAKE receiver to provide an improved estimate of the forward link traffic data.

In the exemplary embodiment of the present invention, the reverse link busy bits are independently generated by each base station and indicative of whether the transmitting base station has reached a reverse link capacity limit. In a first exemplary embodiment, the remote station combines the multipath components of the reverse link busy bits from each of the transmitting base stations in its Active Set and in response transmits a reverse link signal only when all of the reverse link busy bits indicate that the base stations in the remote stations Active Set have reverse link capacity. In a first alternative embodiment, the remote station weights the reverse link busy signals in accordance with the signal strength of the base station transmitting the busy signal and determines whether to transmit based on the weighted sum of the busy signals. In a second alternative embodiment, the remote station weights the reverse link busy signals in accordance with the signal strength of the base station transmitting the busy signal and determines a maximum reverse link data rate based on the weighted sum of the busy signals.

In the exemplary embodiment, the FAC signals are independently generated. The FAC signals from common base stations, multipath components, are soft combined and decoded. Each of the FAC signals is provided to a corresponding Signal-to-Noise Ratio (SNR) calculator for each base station. The calculated SNR for each base station is used to determine which base station should transmit forward link data to the remote station and at what data rate.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
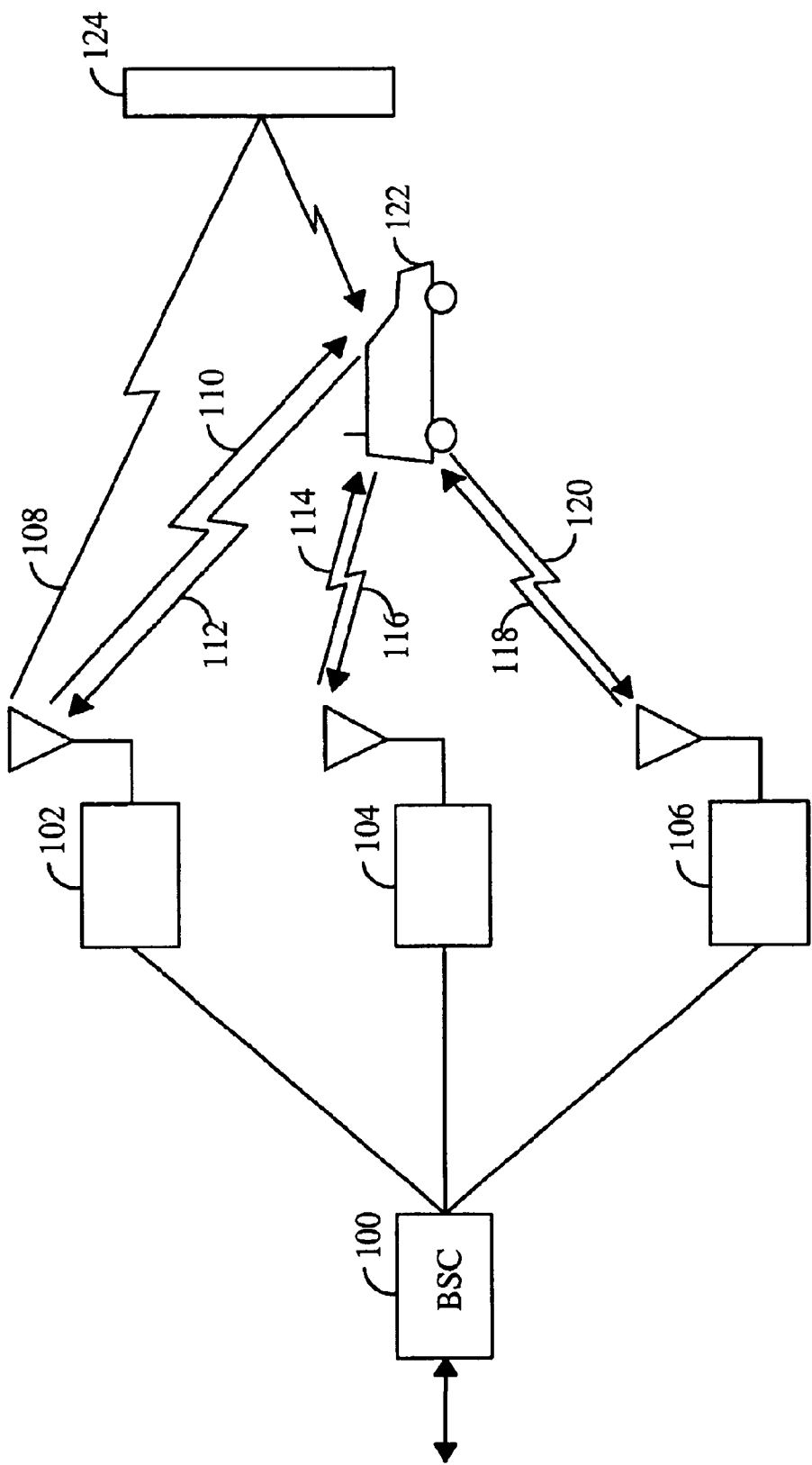
FIG. 1 is a diagram illustrating the components and signals of a soft handoff environment.

FIG. 1 illustrates the elements of a wireless communication system during a soft handoff operation. In the soft handoff condition illustrated in FIG. 1, remote station 122 is in simultaneous communication with base stations 102, 104 and 106. A method and apparatus for performing soft handoff in a wireless communication system is disclosed in the aforementioned U.S. Pat. No. 5,101,501. Base station controller 100 sends information to be transmitted to remote station 122 as to base stations 102, 104 and 106.

In the exemplary embodiment, the forward link traffic data is transmitted to remote station 122 by the selected base station (102, 104 or 106) with the best propagation path to remote station 122. Base stations 102, 104 and 106 transmit forward link signals, including forward link traffic, pilot symbols and overhead data on forward link signals 110, 114, and 118, respectively. In the exemplary embodiment, forward link signals 110, 114 and 118, as well as multipath component signal 108, are code division multiple access (CDMA) communications signals.

Signal 108 illustrates the condition referred to as multipath, whereby the signal transmitted by base station 102 traverses two different propagation paths to remote station 122. The first signal 110 traverses a line of sight propagation path, while a second signal is reflected from an obstacle 124 as forward link signal 108. In a CDMA communications system, multipath components can be combined at the receiver to provide an improved estimate of the transmitted data as is disclosed in the aforementioned U.S. Pat. No. 5,109,390.

Remote station 122 transmits data to base stations 102, 104 and 106 on reverse link signals 112, 116 and 120, respectively. In the exemplary embodiment, reverse link signals 112, 116 and 120 are CDMA communications signals. The reverse link signals received by base stations 102, 104 and 106 are soft combined in base station controller (BSC) 100 to provide a better estimate of the information transmitted by remote station 122. It should be noted that reverse link signals 102, 104 and 106 are actually the same signal traversing different propagation paths.

Figure 2:
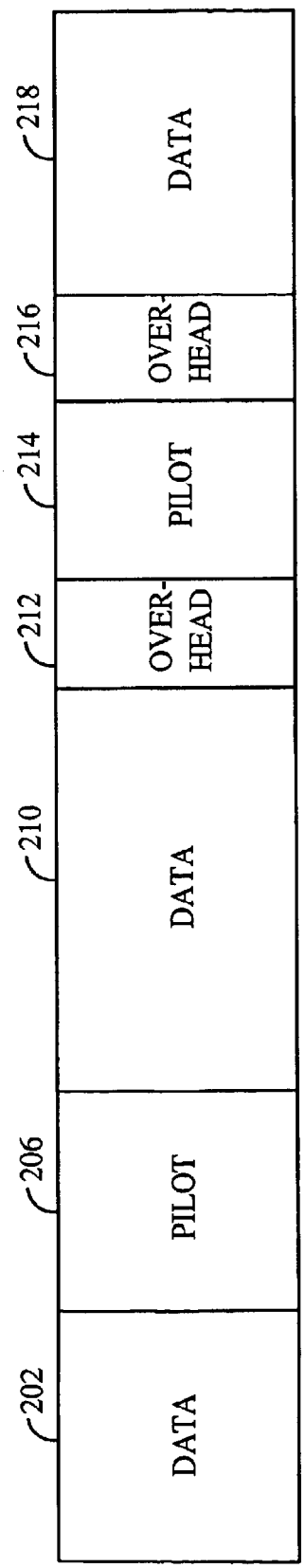
FIG. 2 is an illustration of the forward link slot format of the exemplary embodiment.

FIG. 2 illustrates a forward link slot of the exemplary embodiment. In the exemplary embodiment, a slot is 1.66 ms in duration. The slot includes two pilot bursts 206 and 214. The second pilot burst 214 has overhead data 212 and 216 included on both sides of it. The overhead data of the exemplary embodiment includes forward link activity (FAC) information, reverse link busy bits and reverse link power control commands. The different overhead data are distinguished from one another by means of an orthogonal covering. Orthogonal coverings are well known in the art and are disclosed in the aforementioned U.S. Pat. No. 5,103,459. Forward link activity information is a bit that when set indicates that a predetermined number of slots in the future, there will be no forward link traffic data to be transmitted by the base station. The reverse link busy bits indicate that the reverse link capacity limit of the base station has been reached. The power control commands are covered with unique Walsh coverings and request that a particular remote station increase or decrease its transmission energy. Forward link data is transmitted in the remainder of the frame in sections 202, 210 and 218.

Figure 3:
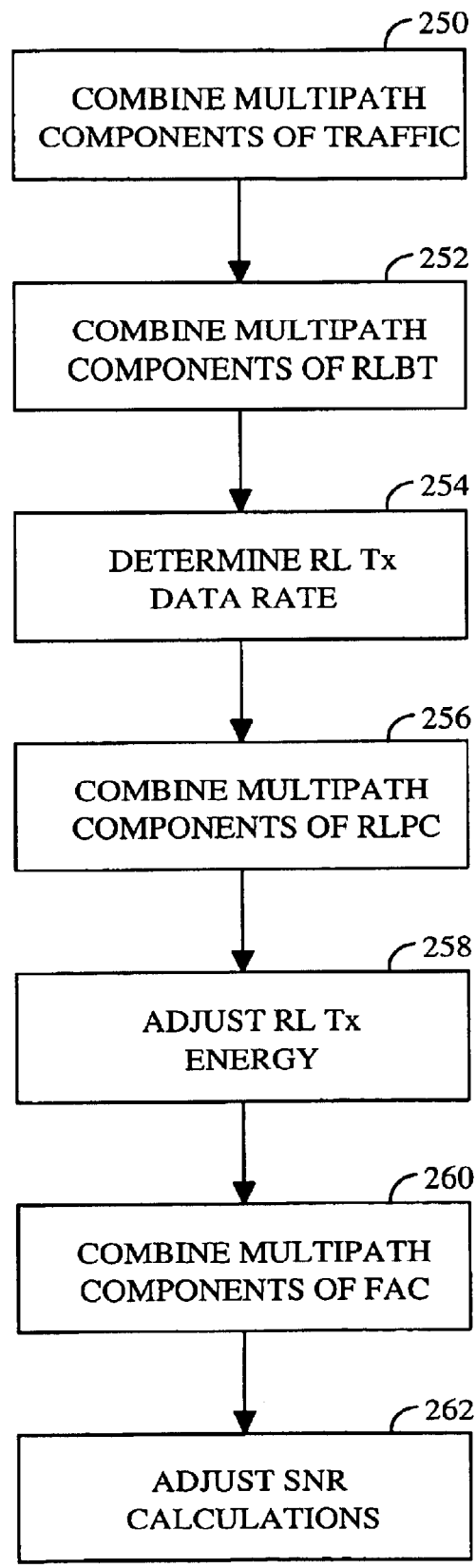
FIG. 3 is a flowchart illustrating the method of combining signals in the exemplary embodiment.

FIG. 3 is a flowchart describing the received signal combining operations performed by remote station 122 when in soft handoff with a plurality of base stations. In block 250, the multipath components of the forward link signal carrying traffic data to remote station 122 are combined. In the exemplary embodiment, only the base station with the best propagation path between it and remote station 122 transmits forward link traffic data to remote station 122. If for example base station 102 has the best propagation path to remote station 122, then base station 102 transmits forward link traffic data to remote station 122. In this example, remote station 122 soft combines multipath signals 108 and 110 to provide an improved estimate of the forward link traffic data. In the exemplary embodiment, the soft combining is performed as a weighted sum wherein the weight of demodulated symbols is determined in proportion to the received signal strength of the signal carrying the symbols. The act of soft combining of multipath signals is described in detail in aforementioned U.S. Pat. No. 5,109,390.

In block 252, remote station 122 soft combines multipath components of the reverse link busy bits transmitted by each base station in the Active Set of remote station 122 to provide an estimate of the reverse link busy bit transmitted by each base station. It should be noted that the power control commands from different base stations may have different values and so cannot be combined meaningfully. That is base station 102 may have exhausted its reverse link capacity while base station 104 may still have remaining reverse link capacity, and as such would transmit reverse link busy bits having different values.

In block 254, the reverse link busy bits from each of base stations 102, 104 and 106 are combined to determine a maximum data rate for the next reverse link transmission by remote station 122. In a first exemplary embodiment, the remote station transmits a reverse link signal only when all of the reverse link busy bits indicate that the base stations in the Active Set have additional reverse link capacity. In a first alternative embodiment, the remote station 122 weights the reverse link busy bits in accordance with the signal strength of the base station transmitting the busy bit and determines whether to inhibit its reverse link transmissions based on the weighted sum of the busy bits. In a second alternative embodiment, the remote station weights the reverse link busy bits in accordance with the signal strength of the base station transmitting the busy bit and determines a maximum reverse link data rate at which to transmit based on the weighted sum of the busy bits.

In block 256, remote station 122 soft combines the multipath components of the reverse power control bits transmitted by each base station to provide an estimate of the reverse power control bits transmitted by each base station. It should be noted that the power control commands from different base stations may not be the same value and so cannot be combined meaningfully. For example, reverse link signal traveling 114 may exceed the energy necessary for reliable transmission of signals to base station 104, while simultaneously the energy of the reverse link signal 112 may be inadequate for reliable reception by base station 102. In this case, base station 104 would transmit an "Up" command, while base station 104 would transmit a "Down" command. Thus, soft combining of power control commands from different base stations should not be performed. In the exemplary embodiment, for each base station, a hard decision regarding the value of its power control command is determined. Proceeding to block 258, in the exemplary embodiment, remote station 122 increases its transmission energy only when all of the power control commands transmitted by the base stations in its Active Set request remote station 122 to increase its transmission energy.

In block 260, the forward link activity bits (FAC) received on multiple paths from common base stations are soft combined. In block 262, each of the combined forward activity bits are then provided to a corresponding SNR calculator which uses the information in its computation of the signal-to-noise ratio energy for a corresponding base station in the Active Set of remote station 122. Referring back to FIG. 2, if the slot does not include data then the estimated signal-to-noise ratio computation for the slot must be adjusted to account for this gated portion of the frame during which no signal energy is present.

Figure 4:
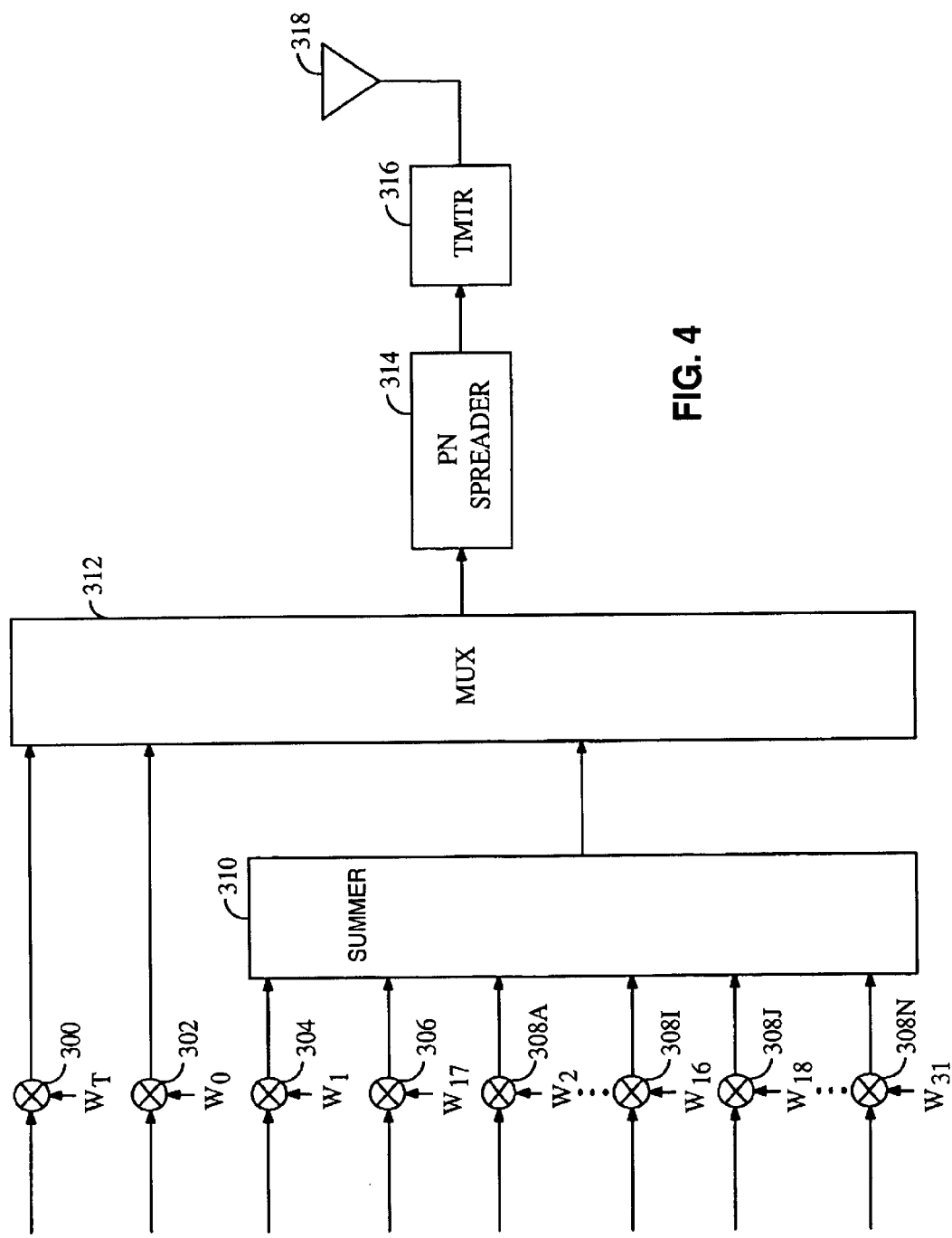
FIG. 4 is a block diagram illustrating the base station transmission system of the exemplary embodiment.

FIG. 4 is a block diagram illustrating the elements of base stations 102, 104 and 106. Forward link traffic data is provided to Walsh spreading element 300 and is covered in accordance with Walsh code ($W_T$). The covered traffic data is then provided to multiplexer 312. It will be understood by one skilled in the art that processing of the signal prior to its provision to Walsh spreading element 300 is within the scope of the present invention. In particular, it is anticipated that the forward link traffic data will be forward error correction coded using a convolutional encoder, turbo coder or other forward error correction coder that is known in the art. In the exemplary embodiment, thirty-two Walsh sequences of length thirty two are used to cover the forward link transmissions. Generation of and spreading in accordance with Walsh codes is disclosed in aforementioned U.S. Pat. No. 5,103,459.

A predetermined set of pilot symbols, typically all ones, is provided to Walsh spreading element 302 and, in the exemplary embodiment, covered in accordance with Walsh code zero ($W_0$). Covering by Walsh zero is a no op and may operationally be omitted but is provided for illustrative purposes. The covered pilot symbols are then provided to multiplexer 312.

The forward activity (FAC) bit is provided to spreading element 304 and covered in accordance with Walsh code one $W_1$. The reverse link busy bit is provided to Walsh spreading element 306 and covered using Walsh code seventeen ($W_{17}$). In addition, up to twenty eight power control commands ($PC_1$–$PC_{29}$) are provided to Walsh spreading elements 308a–308n and are covered using Walsh sequences ($W_2$–$W_{15}$ and $W_{18}$–$W_{31}$). The Walsh spread overhead bits including the FAC, the reverse link busy bit and the power control commands are summed in summer 310 and provided to multiplexer 312.

Multiplexer 312 inserts into the slot the forward link traffic data and two pilot bursts with the second pilot burst having the overhead bits on either side of it. In the exemplary embodiment, the overhead information on both sides of the second pilot burst are replicas of one another and each are 64 Walsh chips in duration spread using thirty two bit Walsh codes providing four redundant versions of each piece of overhead information.

The slot, including the forward link traffic, the pilot bursts and overhead bits, as illustrated in FIG. 2 are provided to PN spreader 314. In the exemplary embodiment, each base station spreads the data for transmission using a different PN sequence. In the preferred embodiment, each base station generates its PN sequence using different phase offsets of generated using a common PN generator polynomial as is described in the aforementioned U.S. Pat. No. 5,103,459. In the preferred embodiment, the data is transmitted in accordance with a QPSK modulation wherein the in-phase and quadrature phase components are spread using to different pseudonoise sequences ($PN_I$ and $PN_Q$). The PN spread signal is provided to transmitter (TMTR) 316 which upconverts, amplifies and filters the signal for transmission through antenna 318.

Figure 5:
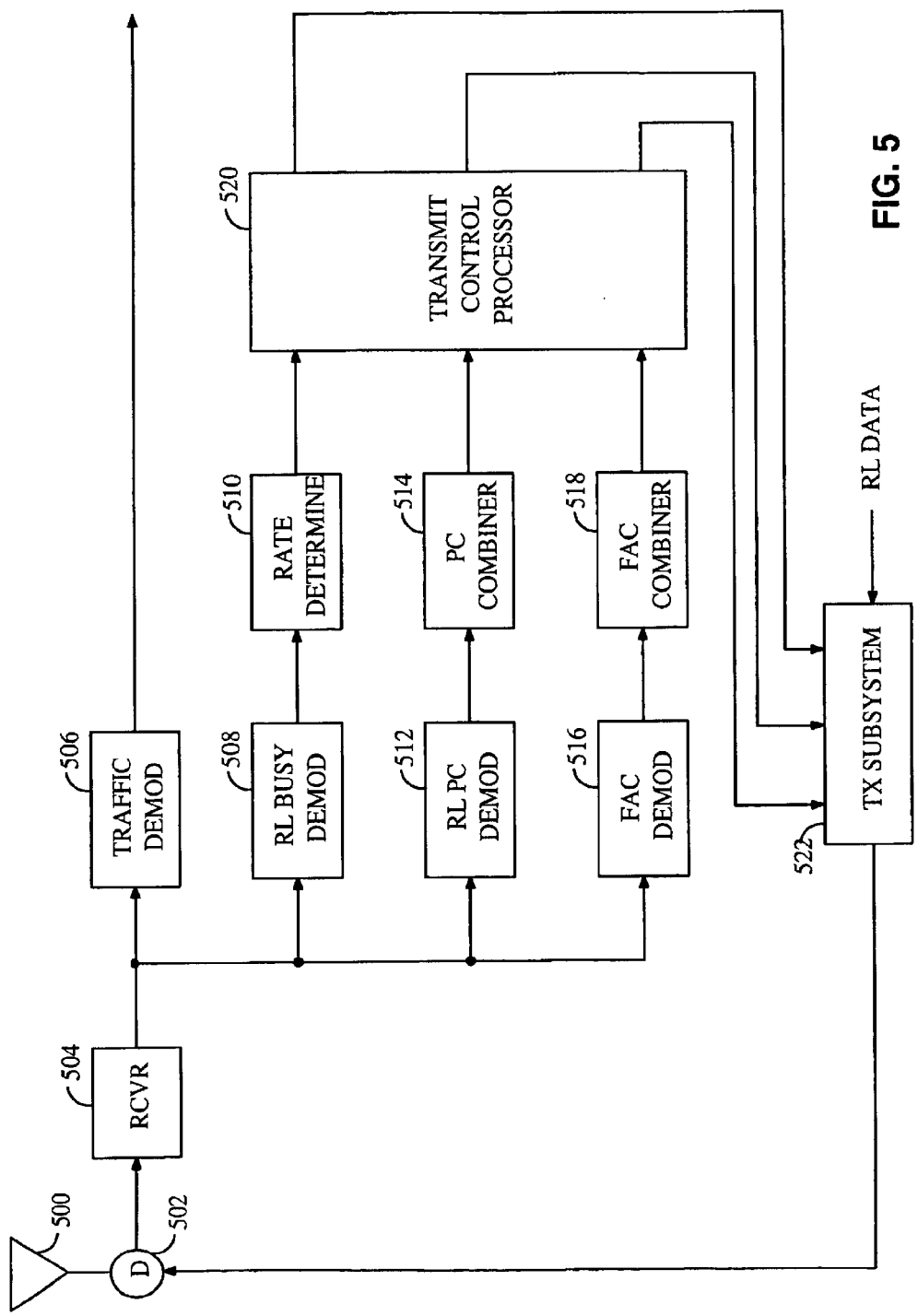
FIG. 5 is a block diagram of the remote station of the present invention.

FIG. 5 illustrates remote station 122 of the present invention. The forward link signal is received at antenna 500 and provided through duplexer 502 to receiver (RCVR) 504. The received signal is provided to traffic demodulator 506, which demodulates the received signal to provide the forward link traffic data to the user of the remote station.

The received signal is provided to reverse link busy demodulator 508 which demodulates the signal to provide an estimate of the reverse link busy bits transmitted by each of the base stations in communication with remote station 122. The reverse link busy bits are provided to rate determination element 510. In the exemplary embodiment, rate determination element 510, inhibits the transmission of the reverse link signal when any of the busy bits from a base station in the Active Set indicate that the reverse link capacity limit for that base station has been reached. In an alternative embodiment, rate determination element 510 selectively inhibits the reverse link transmissions based on a weighted sum of the received busy bits from the base stations in the Active Set of remote station 122. In the first alternative embodiment, the received busy bits are weighted in accordance with the energy of the received signals. In a second alternative embodiment, rate determination element 510 selects a maximum reverse link data rate based on the received busy bits. For example, if the signal from a base station indicating that it has reached reverse link capacity is very weak, rate determination element 510 may select a non-zero reverse link data rate that it estimates will not cause undue interference to the base station due to its poor propagation path to that base station. A signal indicative of either the maximum data rate or an inhibition of the reverse link signal is provided to transmit control processor 520, which determines a set of parameters for transmitting the reverse link signal.

In the preferred embodiment, the mobile station is aware of a transmission rate profile for the base stations in its Active Set in which each of its potential reverse links transmission rates has a known probability of successful transmission under the condition that the base stations in the Active Set are not in a capacity limit condition. In the preferred embodiment, remote station 122 computes a metric referred to herein as a Derating Metric (DM) in accordance with the equation:

$$DM = 1 - \left[ 1, \left( \sum_i SNR_i \cdot RLB_i \right) \left( \frac{1}{\text{Max}SNR_i} \right) \right], \quad (1)$$

where $SNR_I$ is the estimated signal-to-noise ratio of the ith base station, Max $SNR_I$ is the maximum signal-to-noise ratio of the base stations in the Active Set of remote station i, $RLB_i$ is the value of the reverse link busy bit for the ith base station in the Active set which takes a value of 0 or 1. Using equation 1, the stronger the forward link signal from a base station transmitting a reverse link busy bit indicating a reverse link capacity limit condition, the greater will be the derating. This derating metric assumes a value of between 0 and 1 which is used to scale the transmission rate profile such that rates are reduced for a given probability of successful transmission.

The reverse link signal is also provided to reverse link power control demodulator 512. Reverse link power control demodulator 512 demodulates the received signal and combines the multipath components from common base stations to generate improved estimates of the reverse link power control command transmitted by each of the base stations in the Active Set of remote station 122. In the exemplary embodiment, each remote station in communication with a given base station demodulates its reverse link power control commands in accordance with a unique Walsh code assigned to that mobile station. It should be noted that the reverse link power control Walsh codes assigned to the remote station may be different for different base stations in communication with remote station 122.

The improved estimates of the power control commands from each base station are provided to power control combiner 514. In the exemplary embodiment, remote station 122 increases its transmission energy only when all base stations in the Active Set of remote station 122 transmit power control commands requesting remote station 122 to increase its transmission energy. Otherwise, remote station 122 decreases its transmission energy. In addition, the present invention is equally applicable to multi-bit power control systems wherein the base station specifies the amount of the transmission energy adjustment requested. In the simplest implementation of power control combiner 514 for use in a multi-bit power control system, power control combiner 514 selects the smallest requested increase or largest requested decrease in transmission energy.

FAC combiner 518 combines the FAC bits from multipath components of the forward link signal of a common base station to provide an improved estimate of the FAC bit transmitted by each of the base stations. Transmit control processor 520 receives each of the FAC bit estimates and adjusts the computation of the signal-to-noise ratio for each base station based on the estimate of the FAC bit transmitted by that base station. Transmit control processor 520 uses the calculated signal-to-noise ratio of each of the base stations to select the base station with the best propagation path and to determine the maximum data rate of the transmission.

Based on the estimates of the reverse link busy bits, the reverse link power control commands, and the forward activity bits, transmit control processor 520 determines the rate of its next reverse link transmission, an adjustment to its reverse link transmission energy and selects the base station with the best propagation path and the maximum forward link data rate that can be reliably transmitted upon that propagation path. These parameters are provided to transmit subsystem 522 which generates the reverse link signal in accordance therewith. The reverse link signal from transmit subsystem 522 is provided through duplexer 502 for transmission through antenna 500.

Figure 6:
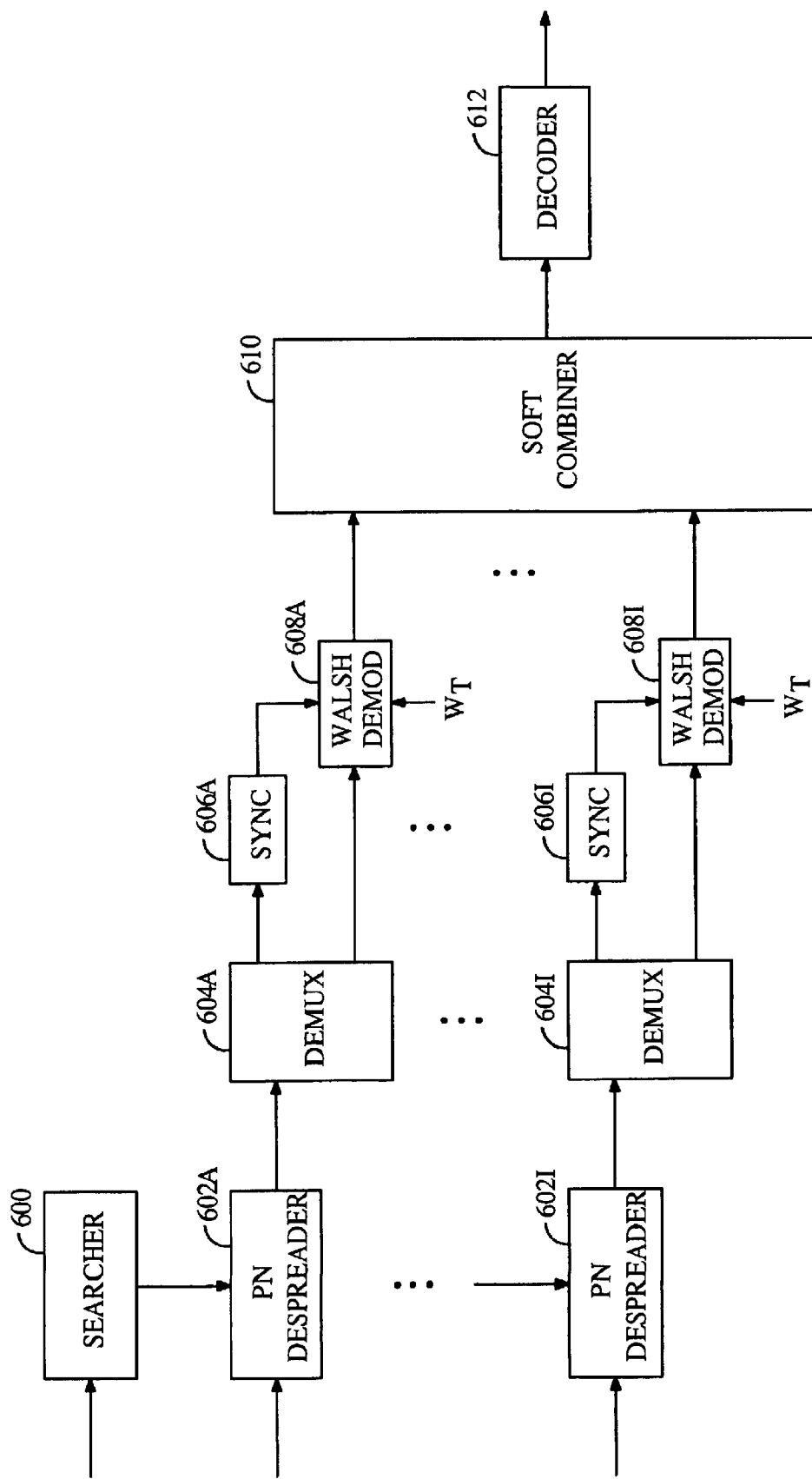
FIG. 6 is a block diagram of the traffic demodulator of the exemplary embodiment.

FIG. 6 illustrates the elements of traffic demodulator 506. Searcher 600 searches potential PN offsets for strong forward link signals. Searcher 600 assigns PN despreaders 602A through 602I PN offsets to demodulate. In the exemplary embodiment, each of PN despreaders 602 despreads the received signal in accordance with a different PN offset and provides the result to a corresponding demultiplexer 604. In the exemplary embodiment, PN despreader 602 despreads the received signal in accordance with a single PN sequence used to spread a BPSK signal. However, the present invention is equally applicable to complex PN despreaders that use two distinct PN code sequences ($PN_I$ and $PN_Q$) to complex despread a QPSK signal. The implementation of PN despreader 602 is well known in the art for both PN despreading of a BPSK signal and complex PN despreading of a QPSK signal.

Demultiplexers 604A through 604I separate the pilot burst portion of the received signal and provide the demodulated pilot symbols to synchronization (SYNC) element 606. Synchronization elements 606A through 606I determine adjustments to the frequency and phase of a corresponding Walsh demodulator 608. A signal indicative of the adjustments to the phase and frequency are provided to Walsh demodulators 608.

Demultiplexer 604 separates out the portions of the slot carrying forward link traffic data and provides those portions to Walsh demodulator 608. Walsh demodulator 608 demodulates the receive signal in accordance with the Walsh sequence $W_T$. The implementation of Walsh demodulator 608 is well known in the art and described in detail in U.S. Pat. No. 5,103,459.

The demodulated forward link symbols are provided to soft combiner 610 which accumulates the multipath components of the base station transmitting the forward link traffic data to remote station 122. The accumulated demodulated symbol energies are then provided to decoder 612 which decodes the forward traffic data and provides the decoded symbols to the user of remote station 122. In the exemplary embodiment, decoder 612 is either a trellis decoder, such as a Viterbi decoder, or a turbo decoder.

Figure 7:
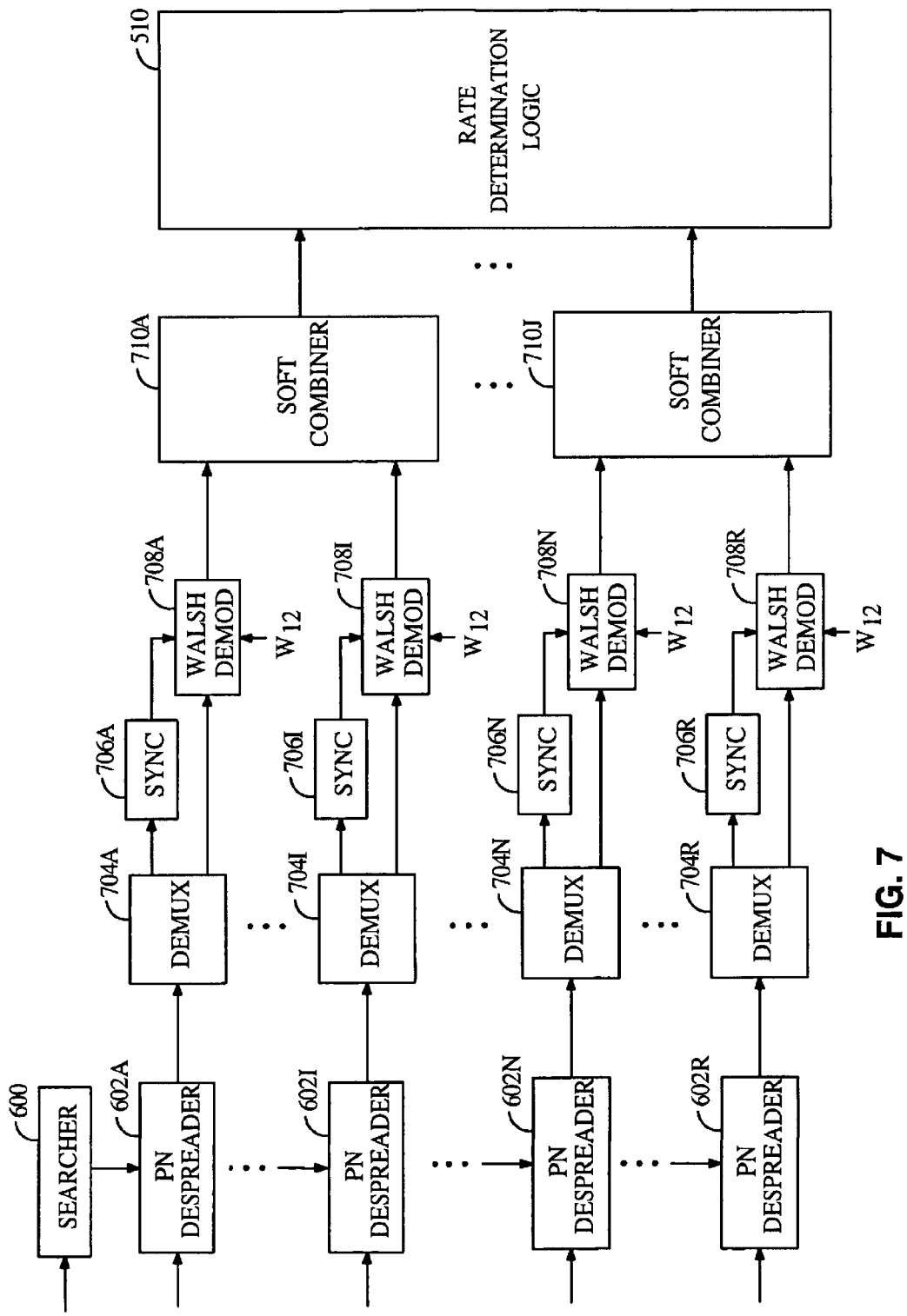
FIG. 7 is a block diagram of the reverse link busy bit demodulator of the exemplary embodiment.

FIG. 7 illustrates the elements of reverse link busy bit demodulator 508. As described with respect to FIG. 6, searcher 600 searches potential PN offsets for strong forward link signals. Searcher 600 assigns PN offsets to each of PN despreaders 602A through 602R. As described above, each of PN despreaders 602 despreads the received signal in accordance with a different PN offset and provides the result to a corresponding demultiplexer 704.

Demultiplexers 704A through 704R separate the pilot burst portion of the slot and provide the pilot symbols to synchronization (SYNC) element 706. Synchronization element 706 determines adjustments to the frequency and phase of a corresponding Walsh demodulator 708. A signal indicative of the adjustments to the phase and frequency are provided to Walsh demodulators 708. It will be understood by one skilled in the art that synchronization elements 706 and synchronization elements 606 perform identical operations and are shown as distinct elements for illustrative purposes only.

Demultiplexers 704A through 704R separate out the portions of overhead data from the received slot and provide those portions to Walsh demodulator 708. In the exemplary embodiment, Walsh demodulators 708A through 708R demodulate the received signal in accordance with the Walsh code $W_{17}$.

The demodulated forward link symbols are provided to soft combiners 710A through 710J, which accumulate the multipath symbols from each of the base stations. The accumulated symbol energies are then provided to rate determination logic 510 which operates as described previously.

Figure 8:
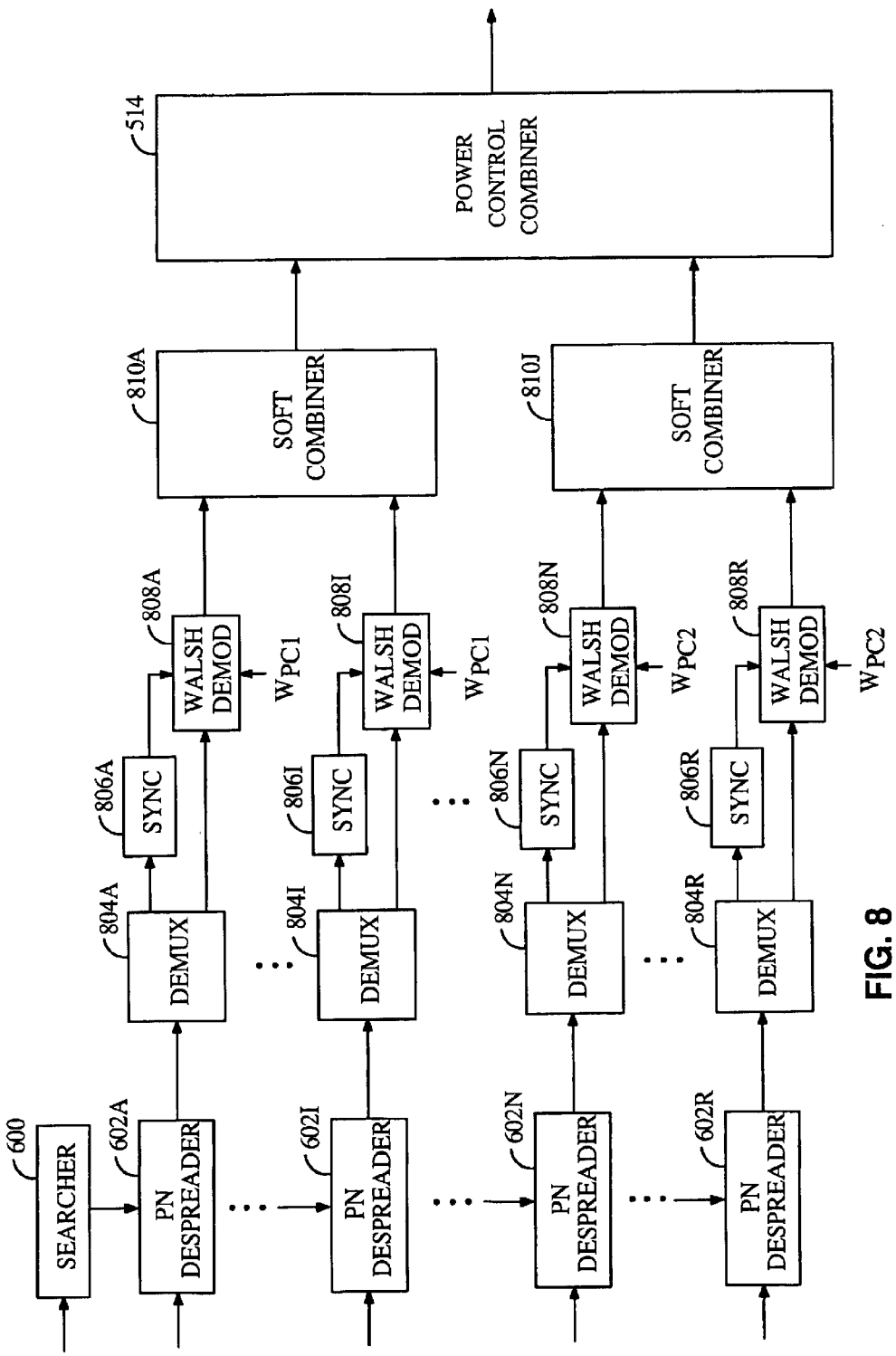
FIG. 8 is a block diagram power control demodulator of the exemplary embodiment.

FIG. 8 illustrates the elements of reverse link power control demodulator 512. As described with respect to FIG. 6, searcher 600 searches potential PN offsets for strong forward link signals. Searcher 600 assigns PN offsets to each PN despreaders 602. As described above, in the exemplary embodiment, each of PN despreaders 602 despreads the received signal in accordance with a different PN offset and provides the result to a corresponding demultiplexer 804.

Demultiplexers 804A through 804R separate the pilot burst portion of the slot and provide the pilot symbols to synchronization (SYNC) elements 806A through 806R. Synchronization elements 806 determine adjustments to the frequency and phase of a corresponding Walsh demodulator 808. A signal indicative of the adjustments to the timing phase and frequency are provided to Walsh demodulators' 808A through 808R. It will be understood by one skilled in the art that synchronization elements 806 and synchronization elements 606 perform identical operations and are shown as distinct elements for illustrative purposes only.

Demultiplexer 804 separates out the portions of overhead data from the received slot and provides those portions to Walsh demodulator 808. In the exemplary embodiment, Walsh demodulator 808 demodulates the received signal in accordance with a Walsh code that is specific for transmission of the power control signals for a corresponding base station. For example, base station 102 may cover its power control commands to remote station 122 using Walsh code five, while base station 104 may cover its power control commands to remote station 122 using Walsh code thirteen. Thus, the multipath components of forward link transmitted from a common base station are demodulated using a common Walsh code to extract the power control commands from that base station. Whereas, power control commands from different base stations are demodulated using different Walsh codes.

The demodulated power control commands from each base station are provided to soft combiners 810A through 810J which accumulate the multipath symbols for a corresponding one of the base stations in its Active Set. The accumulated symbol energies are then provided to power control combiner 514 which operates as described previously.

Figure 9:
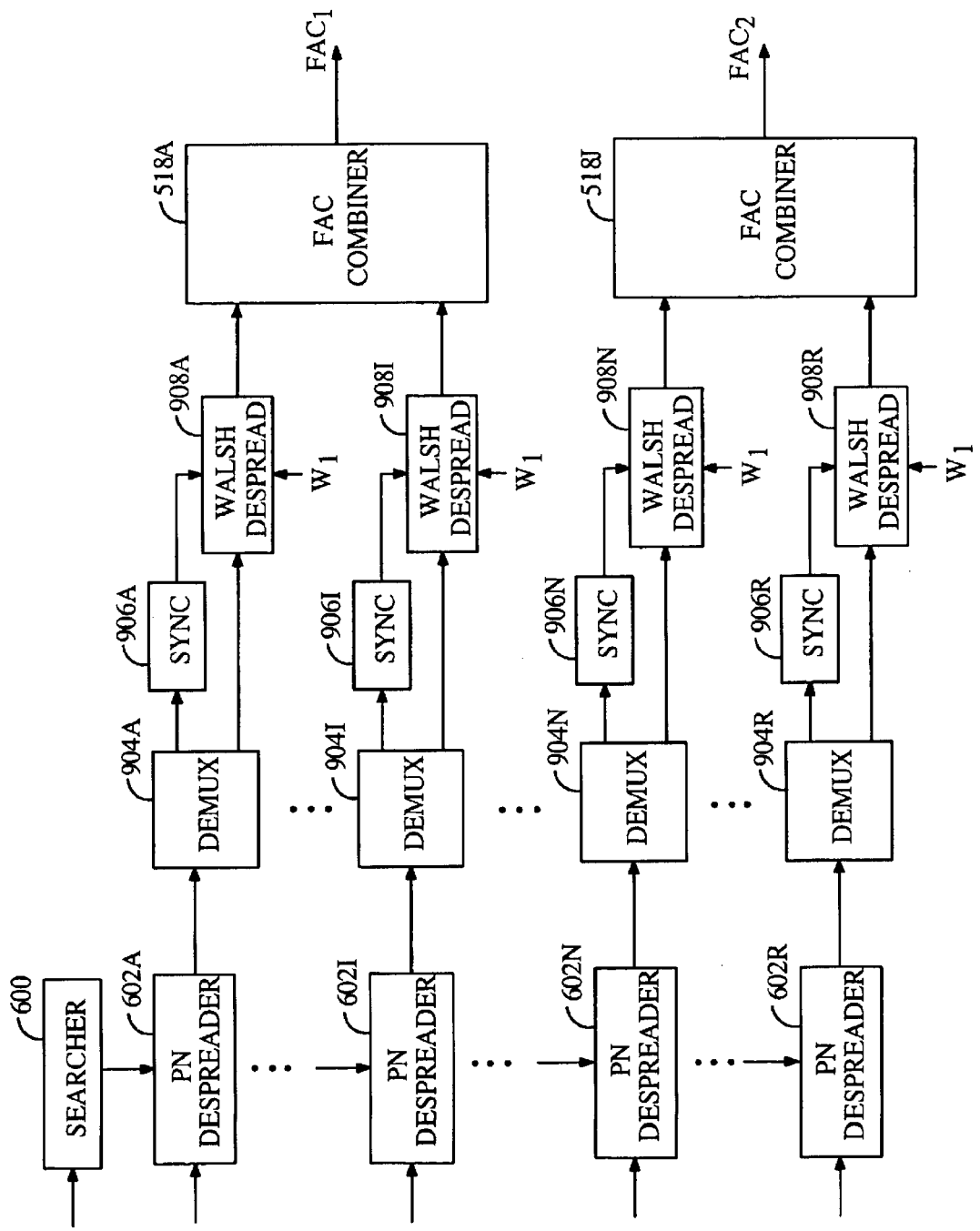
FIG. 9 is a block diagram of the forward link activity (FAC) demodulator of the exemplary embodiment.

FIG. 9 illustrates the elements of FAC demodulator 516. As described with respect to FIG. 6, searcher 600 searches potential PN offsets for strong forward link signals. Searcher 600 assigns PN offsets to each PN despreaders' 602A through 602R. As described above, in the exemplary embodiment, each of PN despreaders 602 despreads the received signal in accordance with a different PN offset and provides the result to a corresponding demultiplexer 904.

Demultiplexers 904A through 904R separate the pilot burst portion of the slot and provide that to synchronization (SYNC) element 906. Synchronization element 906 determines adjustments to the frequency and phase of a corresponding Walsh demodulator 908. A signal indicative of the adjustments to the phase and frequency are provided to Walsh demodulators 908A through 908R. It will be understood by one skilled in the art that synchronization elements 906A through 906R and synchronization elements 606 perform identical operations and are shown as distinct elements for illustrative purposes only.

Demultiplexer 904 separates out the portions of overhead data from the received slot and provides those portions to Walsh demodulator 908. In the exemplary embodiment, Walsh demodulator 908 demodulates the received signal in accordance with a Walsh code one ($W_1$). The demodulated FAC symbols from common base stations are provided to a combiner 910. Combiners 910 combine the energies of the FAC symbols to provide an improved estimate of the FAC bits for each base station in the Active Set of remote station 122.

The maximum data rate from rate determination element 510, the combined power control command from power control combiner 514 and the estimated forward activity bits for each of the base stations in the Active set of remote station 122 are provided to transmit control processor 520. In accordance therewith, transmit control processor 520 determines the data rate of the next reverse link transmission, from remote station 122 generates a signal to adjust the transmission energy of the reverse link signal, selects the base station to send forward link traffic data to remote station 122 and then determines the maximum rate at which the forward link data can be reliably transmitted.

Figure 10:
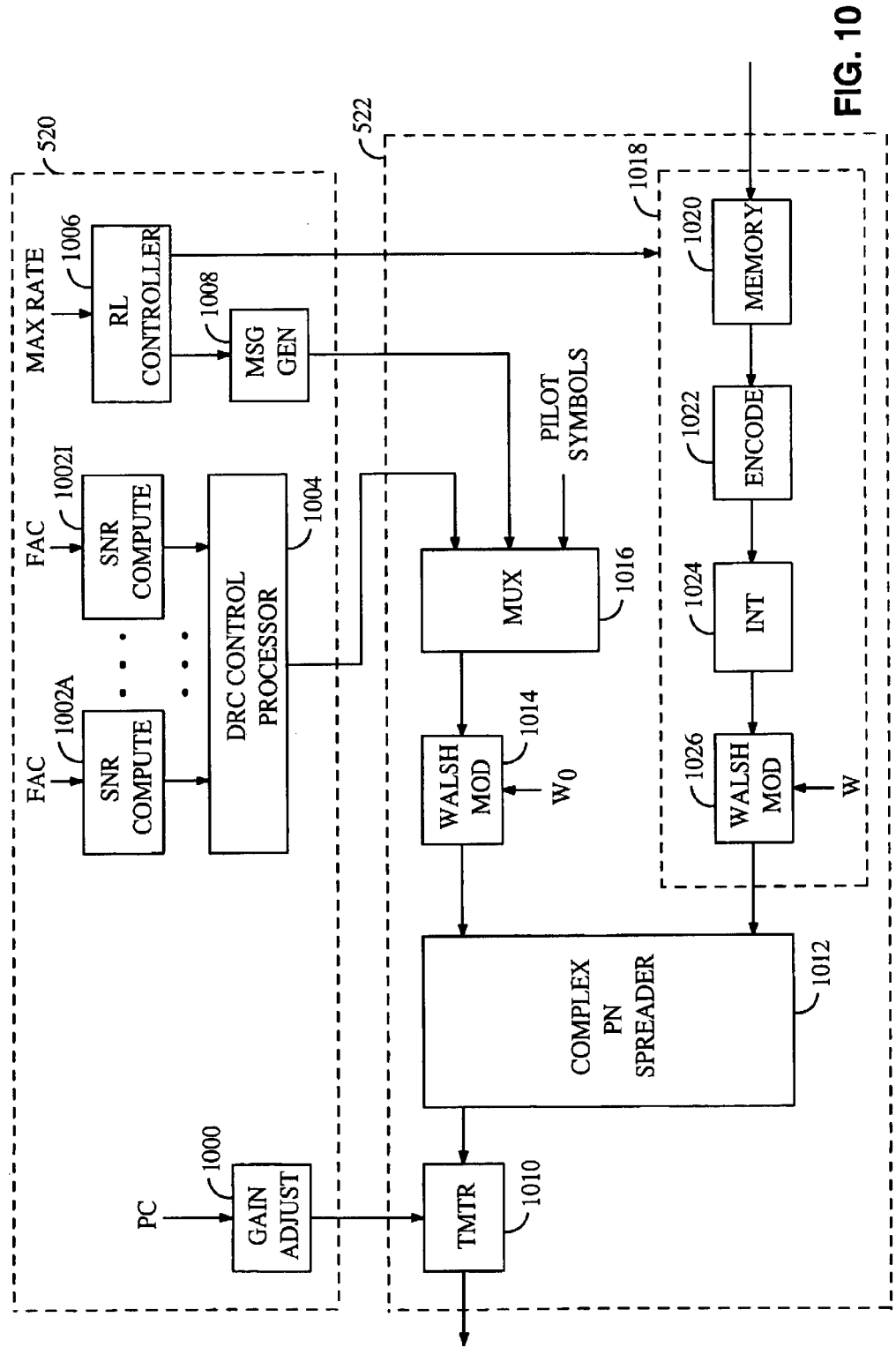
FIG. 10 is a block diagram of the remote station transmission subsystem.

FIG. 10 illustrates the elements of transmit control processor 520 and transmit subsystem 522. In transmit control processor 520, the combined power control command (PC) is provided to gain adjustment element 1000. The power control command in the exemplary embodiment is a single bit up/down command in response to which gain adjustment element 1000 generates a control signal increasing or decreasing the transmission energy of the reverse link signal by adjusting the gain of a variable gain amplifier (not shown) within transmitter (TMTR) 1010.

The FAC estimates for each base station are provided to a corresponding signal-to-noise computers 1002A through 1002I. In response to the FAC bits, signal-to-noise computers 1002A through 1002I calculate the signal-to-noise ratio of the forward link signals from a base station in the Active Set of remote station 122. Slots received without forward link traffic data are incorporated into the signal-to-noise ratio computation differently from those frames that include forward link traffic data. If the occurrence of frames without forward link traffic data is sufficiently rare, these frames may be excluded from the computation entirely. In a preferred embodiment, the signal-to-noise energy of frames without forward link traffic data are scaled prior to being accumulated into the signal-to-noise ratio computation.

The estimates of the signal-to-noise ratio for the forward link signal from each base station is provided from signal-to-noise computers 1002A through 1002I to DRC control processor 1004. DRC control processor 1004 selects the base station that has the highest signal to nose ratio and determines a maximum transmission rate in accordance with the signal-to-noise ratio of the selected base station. A signal indicative of the identity of the selected base station and the maximum data rate is generated by DRC control processor 1004 and provided to multiplexer (MUX) 1016.

The reverse link data rate derated by the method described with respect to equation (1) is determined by rate determination element 510 and provided to reverse link controller 1006. Reverse link controller 1006 determines the rate at which to transmit its reverse link signal in accordance with this maximum data rate. In the exemplary embodiment, reverse link controller 1006 determines the reverse link data rate in accordance with the maximum data rate, the amount of data queued to be transmitted by remote station 122, and the amount of battery power remaining in remote station 122.

A signal indicative of the selected reverse link data rate is provided to message generator 1008. In response message generator 1008 generates a signal indicative of the selected reverse link data rate and provides the reverse rate indicator (RRI) message to multiplexer 1016. In addition, reverse link controller 1006 provides a signal indicative of the selected reverse link data rate to reverse link traffic processing element 1018.

In response to the reverse link data rate signal, memory element 1020 in reverse link traffic processing element 1018 provides an amount of data for transmission. The data is encoded by encoder 1022. The encoding rate and encoding algorithm used by encoder 1022 may also be selected in response to the selected reverse link data rate. The encoded symbols are provided to interleaver (INT) 1024 which reorders the symbols in accordance with a predetermined interleaving format. The interleaved symbols are provided to Walsh modulator 1026.

In the exemplary embodiment, the Walsh modulation is performed using variable length Walsh sequences in which the length of the Walsh sequence (and accordingly the spreading gain) is varied inversely with rate of the reverse link transmission. The use of variable length Walsh sequences is described in detail in U.S. Pat. No. 5,571,761, entitled "SYSTEM AND METHOD FOR ORTHOGONAL SPREAD SPECTRUM SEQUENCE GENERATION IN VARIABLE DATA RATE SYSTEMS," which is assigned to the assignee of the present invention and incorporated by reference herein.

The Walsh spread reverse link traffic data is provided to complex PN spreader 1012. Multiplexer 1016 multiplexes the data rate control message and the reverse rate indicator message with pilot symbols and provides the multiplexed data to Walsh modulator 1014. Walsh modulator 1014 spreads the multiplexed data in accordance with the Walsh code zero and provides the spread data to complex PN spreader 1012.

In the exemplary embodiment, the PN spreading of the reverse link signal is performed in accordance with two distinct PN sequences ($PN_I$ and $PN_Q$) in order to evenly distribute the load the in-phase and quadrature-phase components of the transmitted QPSK signal. The implementation of complex PN spreader 1012 is disclosed in the aforementioned U.S. Pat. No. 6,396,804.

The complex PN spread data is provided to transmitter 1010 which amplifies, filters and upconverts the complex PN spread signal for transmission.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A remote station comprising:
    a means for weighing reverse link busy signals from a plurality of base stations in accordance with a signal strength of one of the plurality of base stations transmitting one of the reverse link busy signals; and
    a means for determining whether to transmit on a reverse link based on a weighted sum of the reverse link busy signals.

2. The remote station of claim 1, wherein the remote station is configured to weigh the reverse link busy signals in accordance with the signal strength of the base station transmitting the busy signal and determines a maximum reverse link data rate based on the weighed sum of the busy signals.

3. The remote station of claim 1, configured to compute a derating metric used to scale a reverse link transmission rate.

4. The remote station of claim 3, wherein the derating metric is used to scale the transmission rate such that the transmission rate is reduced for a given probability of successful transmission.

5. The remote station of claim 3, wherein the stronger a forward link signal from a base station transmitting a reverse link busy bit indicating a reverse link capacity limit condition, the greater will be the derating.

6. The remote station of claim 3, wherein the derating metric is computed in accordance with values of reverse link busy bits transmitted on a forward link by a base station.

7. The remote station of claim 3, wherein the derating metric is computed in accordance with values of reverse link busy bits transmitted by a base station and the strength of a forward link signal from the base station as received by said remote station.

8. A communication system, comprising:
    a remote station configured to transmit reverse link data to a base station at a reverse link transmission rate in accordance with a derating metric, the derating metric being computed in accordance with values of the reverse link busy bits transmitted by each base station and the strength of the forward link signals from each base station as received by said remote station; and
    a plurality of base stations, each base station configured to transmit forward link data to the remote station, the forward link data including a reverse link busy bit, the reverse link busy bit indicating when a base station has reached its reverse link capacity limit.

9. The communication system of claim 8, wherein the derating metric (DM) is computed in accordance with the equation:

$$DM = 1 - \left[1, \left(\sum_i SNR_i \cdot RLB_i\right)\left(\frac{1}{\text{Max}SNR_i}\right)\right],$$

where $SNR_I$ is the estimated signal-to-noise ratio of the ith base station, Max $SNR_I$ is the maximum signal-to-noise ratio of the base stations in the Active Set of remote station i, $RLB_i$ is the value of the reverse link busy bit for the ith base station in the Active set which takes a value of 0 or 1.

10. A communication system, comprising:

a remote station configured to transmit reverse link data to a base station at a reverse link transmission rate in accordance with a rate transmission profile, the rate transmission profile being indicative of the probability of successful transmission for each potential reverse link transmission rate in accordance with a derating metric, the derating metric being computed in accordance with values of the reverse link busy bits transmitted by each base station and the strength of forward link signals from each base station as received by said remote station; and a plurality of base stations, each base station configured to transmit forward link data to the remote station, the forward link data including a reverse link busy bit, the reverse link busy bit indicating when a base station has reached its reverse link capacity limit.

11. The communication system of claim 10, wherein the derating metric (DM) is computed in accordance with the equation:

$$DM = 1 - \left[1, \left(\sum_i SNR_i \cdot RLB_i\right)\left(\frac{1}{\text{Max} SNR_i}\right)\right],$$

where $SNR_I$ is the estimated signal-to-noise ratio of the ith base station, Max $SNR_I$ is the maximum signal-to-noise ratio of the base stations in the Active Set of remote station i, $RLB_i$ is the value of the reverse link busy bit for the ith base station in the Active set which takes a value of 0 or 1.

12. A remote station, comprising:

an antenna that receives a forward link signal;

a receiver;

a transmitter;

a duplexer coupled to the antenna and the transmitter, the duplexer providing the forward link signal to the receiver;

a traffic demodulator coupled to the receiver, the traffic demodulator configured to demodulate the received signal to provide forward link traffic data to the user of the remote station; and a reverse link busy demodulator coupled to the receiver, the reverse link busy demodulator configured to demodulate the received signal to provide estimates of reverse link busy bits transmitted by each of the base stations in communication with the remote station.

13. The remote station of claim 12, further comprising a rate determination element configured to receive the estimates of the reverse link busy bits from the reverse link busy demodulator.

14. The remote station of claim 13, wherein the rate determination element is configured to inhibit the transmission of a reverse link signal when any of the estimates of the reverse link busy bits from a base station in a remote station Active Set indicate that the reverse link capacity limit for that base station has been reached.

15. The remote station of claim 13, wherein the rate determination element is configured to selectively inhibit the reverse link transmissions based on a weighed sum of the received busy bits from the base stations in the Active Set of the remote station.

16. The remote station of claim 14 further comprising a transmit control processor configured to receive a signal from the rate determination element indicating inhibiting reverse link transmissions, the transmit control processor signals the transmitter not to transmit reverse link data.

17. The remote station of claim 15, wherein the rate determination element is configured to weigh the estimates of the reverse link busy bits in accordance with the energy of the received signals.

18. The remote station of claim 17, wherein the rate determination element is configured to select a maximum reverse link data rate based on the estimates of the reverse link busy bits.

19. The remote station of claim 18 further comprising a transmit control processor configured to receive a signal from the rate determination element indicative of the maximum data rate and signals the transmitter to transmit reverse link data in accordance with the maximum reverse link data rate.

20. The remote station of claim 12 further comprising a reverse link power control demodulator coupled to the receiver and configured to demodulate the received signal and combine multipath components from common base stations to generate estimates of reverse link power control command transmitted by each of the base stations in an Active Set of the remote station.

21. The remote station of claim 20, wherein the remote station is configured to demodulate its reverse link power control commands in accordance with a unique Walsh code assigned to the remote station.

22. The remote station of claim 20 further comprising a power control combiner coupled to the reverse link power control demodulator and configured to take as input the estimates of reverse link power control commands from each base station and provide a combined power control command.

23. The remote station of claim 22, wherein the power control combiner is configured to cause the remote station to increase remote station transmission energy only when all base stations in an Active Set of the remote station transmit power control commands requesting the remote station to increase its transmission energy.

24. The remote station of claim 22, wherein the power control combiner is configured to select the largest requested decrease in transmission energy of the estimates.

25. The remote station of claim 22, wherein the power control combiner is configured to select the smallest requested increase in transmission energy of the estimates.

26. The remote station of claim 12 further comprising a FAC demodulator coupled to the receiver and configured to demodulate the received signal to provide FAC bits from multipath components of the forward link signal of a common base station.

27. The remote station of claim 26 further comprising a FAC combiner coupled to the FAC demodulator an configured to combine the FAC bits to provide an estimate of the FAC bit transmitted by each of the base stations.

28. The remote station of claim 27 further comprising a transmit control processor configured to receive each of the FAC bit estimates and adjust a computation of a signal-to-noise ratio for each base station based on the FAC bit estimates.

29. The remote station of claim 28, wherein the transmit control processor uses the calculated signal-to-noise ratio of each of the base stations to select the base station with the best propagation path and to determine the maximum data rate of the transmission.

30. The remote station of claim 28, wherein the transmit control processor is configured to adjust a reverse link transmission energy parameter.

31. The remote station of claim 27, further comprising a rate determination element coupled to the reverse link busy demodulator and configured to receive the estimates of the reverse link busy bits from the reverse link busy demodulator.

32. The remote station of claim 31 further comprising a reverse link power control demodulator coupled to the receiver and configured to demodulate the received signal and combine multipath components from common base stations to generate estimates of reverse link power control command transmitted by each of the base stations in an Active Set of the remote station.

33. The remote station of claim 32 further comprising a power control combiner coupled to the reverse link power control demodulator and configured to take as input the estimates of reverse link power control commands from each base station and provide a combined power control command.

34. The remote station of claim 33 further comprising a transmit control processor coupled to the rate determination element, the power control combiner and FAC combiner, and configured to determine a reverse link transmission rate based on the estimates of the reverse link busy bits, the reverse link power control commands, and the FAC bits.

35. The remote station of claim 34, wherein the transmitter is configured to generate a reverse link signal in accordance with the reverse link transmission rate and the reverse link transmission energy parameter.

36. A remote station, comprising:
an antenna that receives a forward link signal;
a receiver;
a transmitter;
a duplexer coupled to the antenna and transmitter, the duplexer providing the forward link signal to the receiver; and
a traffic demodulator configured to demodulate the received signal to provide forward link traffic data to the user of the remote station, wherein the traffic demodulator includes:
a searcher configured to search potential PN offsets for strong forward link signals and assigns a plurality of PN despreaders a plurality of PN offsets to demodulate;
a plurality of PN despreaders, wherein each of the PN despreaders is configured to despread the received signal in accordance with a different PN offset and provides the result to a corresponding demultiplexer;
a plurality of demultiplexers configured to separate a pilot bust portion and forward link traffic data of the despreaded received signal and provides the demodulated pilot symbols to a synchronization (SYNC) element and the forward link traffic data to a plurality of Walsh demodulators;
a plurality of synchronization elements configured to determine adjustments to the frequency and phase of corresponding Walsh demodulators;
a plurality of Walsh demodulator configured to demodulate the despreaded receive signals in accordance with a Walsh sequence $W_T$ and provide demodulated forward link symbols; and
a soft combiner configured to soft combine the demodulated forward link symbols, thereby accumulating the multipath components of the base station transmitting the forward link signal to the remote station.

37. The remote station of claim 36 further comprising a decoder configured to decodes the forward link signal and provides the decoded symbol to the user of remote station.

38. The remote station of claim 36, wherein, each PN despreader is configured to despread the received signal in accordance with a single PN sequence used to spread a BPSK signal.

39. The remote station of claim 36, wherein each PN despreader is a complex PN despreader that use two distinct PN code sequences ($PN_I$ and $PN_Q$) to complex despread a QPSK signal.

40. A remote station, comprising:
an antenna that receives a forward link signal;
a receiver;
a transmitter;
a duplexer coupled to the antenna and transmitter, the duplexer providing the forward link signal to the receiver; and
a reverse link busy bit demodulator configured to demodulate the received signal to provide an estimate of the reverse link busy bits transmitted by each of the base stations in communication with the remote station, wherein the reverse link busy bit demodulator includes:
a searcher configured to search potential PN offsets for strong forward link signals and assigns a plurality of PN despreaders a plurality of PN offsets to demodulate;
a plurality of PN despreaders, wherein each of the PN despreaders is configured to despread the received signal in accordance with a different PN offset and provides the result to a corresponding demultiplexer;
a plurality of demultiplexers configured to separate a pilot bust portion and overhead data of the despreaded received signal and provide the demodulated pilot symbols to a synchronization (SYNC) element and the overhead data to a plurality of Walsh demodulators;
a plurality of synchronization elements configured to determine adjustments to the frequency and phase of corresponding Walsh demodulators;
a plurality of Walsh demodulator configured to demodulate the despreaded receive signals in accordance with a Walsh sequence $W_{17}$ and provide demodulated forward link symbols;
a soft combiner configured to soft combine the demodulated forward link symbols, thereby accumulating the multipath components of the base station transmitting the forward link signal to the remote station; and
a rate determination logic configured to determine reverse link transmission.

41. The remote station of claim 40, wherein the rate determination logic is configured to inhibit the transmission of a reverse link signal when any reverse link busy bits of the overhead data from a base station in a remote station Active Set indicate that the reverse link capacity limit for that base station has been reached.

42. The remote station of claim 41, wherein the rate determination logic is configured to selectively inhibit the reverse link transmissions based on a weighed sum of the reverse link busy bits of the overhead data from the base stations in the Active Set of the remote station.

43. The remote station of claim 42, wherein the rate determination logic is configured to weigh the reverse link busy bits in accordance with the energy of the received signals.

44. The remote station of claim 40, wherein the rate determination logic is configured to select a maximum reverse link data rate based on the reverse link busy bits.

45. A remote station, comprising:
an antenna that receives a forward link signal;

a receiver;

a transmitter;

a duplexer coupled to the antenna and transmitter, the duplexer providing the forward link signal to the receiver; and a reverse link power control demodulator configured to demodulate the received signal to provide forward link traffic data to the user of the remote station, wherein the traffic demodulator includes:

a searcher configured to search potential PN offsets for strong forward link signals and assigns a plurality of PN despreaders a plurality of PN offsets to demodulate;

a plurality of PN despreaders, wherein each of the PN despreaders is configured to despread the received signal in accordance with a different PN offset and provides the result to a corresponding demultiplexer;

a plurality of demultiplexers configured to separate the pilot bust portion and the overhead data of the despreaded received signal and provides the demodulated pilot symbols to a synchronization (SYNC) element and the overhead data to a plurality of Walsh demodulators;

a plurality of synchronization elements configured to determine adjustments to the frequency and phase of corresponding Walsh demodulators;

a plurality of Walsh demodulators, each Walsh demodulator configured to demodulate the despreaded receive signal with a Walsh code that is specific for transmission of power control signals for a corresponding base station, thereby providing demodulated power control commands from each base station;

a plurality of soft combiners configured to soft combine the demodulated power control commands, thereby accumulating the multipath components of the base station transmitting the forward link signal to the remote station; and a power control combiner configured to combine the combined power control commands from each base station.

46. The remote station of claim 45, wherein the combined power control command is a single bit up/down command.

47. The remote station of claim 45, wherein the power control combiner is configured to cause the remote station to increase remote station transmission energy only when all base stations in an Active Set of the remote station transmit power control commands requesting the remote station to increase its transmission energy.

48. The remote station of claim 45, wherein the power control combiner is configured to select the largest requested decrease in transmission energy of the power control commands.

49. The remote station of claim 45, wherein the power control combiner is configured to select the smallest requested increase in transmission energy of the power control commands.

50. A remote station, comprising:

an antenna that receives a forward link signal;

a receiver;

a transmitter;

a duplexer coupled to the antenna and transmitter, the duplexer providing the forward link signal to the receiver; and a FAC demodulator configured to demodulate the received signal to provide forward link traffic data to the user of the remote station, wherein the FAC demodulator includes:

a searcher configured to search potential PN offsets for strong forward link signals and assigns a plurality of PN despreaders a plurality of PN offsets to demodulate;

a plurality of PN despreaders, wherein each of the PN despreaders is configured to despread the received signal in accordance with a different PN offset and provides the result to a corresponding demultiplexer;

a plurality of demultiplexers configured to separate a pilot bust portion and overhead data of the despreaded received signal and provides the demodulated pilot symbols to a synchronization (SYNC) element and the overhead data to a plurality of Walsh demodulators;

a plurality of synchronization elements configured to determine adjustments to the frequency and phase of corresponding Walsh demodulators;

a plurality of Walsh demodulators configured to demodulate the despreaded receive signals in accordance with a Walsh sequence $W_1$ and provide demodulated FAC symbols; and a FAC combiner configured to combine the energies of the FAC symbols to provide an improved estimate of the FAC bits for each base station in an Active Set of remote station.

51. The remote station of claim 33 further comprising a transmit control processor, the transmit control processor including:

a gain adjust configured to generates a control signal responsive to the combined power control command;

a plurality of signal-to-noise computers configured to calculate a plurality of signal-to-noise ratios of the received signals from a plurality of base stations in an active set of the remote station in response to the FAC estimates from each base station; and a control processor coupled to the plurality of signal-to-noise computers and configured to select the base station that has the highest signal-to-noise ratio and determine a maximum transmission rate in accordance with the signal-to-noise ratio of the selected base station.

52. The remote station of claim 51, wherein the control processor is configured to generate a message indicative of the identity of the selected base station and the maximum data rate.

53. The remote station of claim 51, wherein the control signal is configured to increase the transmission energy of a reverse link signal.

54. The remote station of claim 51, wherein the control signal is configured to decrease the transmission energy of a reverse link signal.

55. The remote station of claim 51, wherein frames received without forward link traffic data are incorporated into the signal-to-noise ratio computation differently from frames that include forward link traffic data.

56. The remote station of claim 55, wherein the signal-to-noise energy of frames without forward link traffic data are scaled prior to being accumulated into the signal-to-noise ratio computation.

57. The remote station of claim 51 further comprising a reverse link controller configured to determine the rate at which to transmit its reverse link signal in accordance with the maximum transmission rate.

58. The remote station of claim 57, wherein the reverse link controller is configured to determine the amount of data queued to be transmitted by the remote station and the amount of battery power remaining in remote station.

59. The remote station of claim 57 further comprising a message generator coupled to the reverse link controller, the message generator configured to generate a reverse rate indicator message indicative of the reverse link data rate in response to a signal provided by the reverse link controller, the signal being indicative of the reverse link data rate.

60. The remote station of claim 59 further comprising a transmitter subsystem, the transmitter subsystem including a reverse link traffic processing element.

61. The remote station of claim 60, wherein the reverse link processing element comprises:

a memory element configured to provide an amount of data for transmission in response to the reverse rate indicator message;

an encoder configured to encode the data;

an interleaver configured to reorder the encoded data in accordance with a predetermined interleaving format; and a first Walsh modulator configured to perform Walsh modulation on the interleaved data producing Walsh spread reverse link traffic data.

62. The remote station of claim 61, wherein the encoding rate and encoding algorithm used by the encoder may be selected in response to the reverse link data rate.

63. The remote station of claim 61, wherein the Walsh modulation is performed using variable length Walsh sequences in which the length of the Walsh sequence (and accordingly the spreading gain) is varied inversely with rate of the reverse link transmission.

64. The remote station of claim 61 further comprising a multiplexer configured to multiplex the data rate control message and the reverse rate indicator message with pilot symbols.

65. The remote station of claim 64 further comprising a second Walsh modulator configured to spread the multiplexed data in accordance with a Walsh code and provides the spread data to a complex PN spreader.

66. The remote station of claim 64, wherein the Walsh code is a Walsh code zero.

67. The remote station of claim 65 further comprising a complex PN spreader coupled to the first Walsh modulator and the second Walsh modulator, the complex PN spreader configured to spread the Walsh spread reverse link traffic data in accordance with two distinct PN sequences ($PN_I$ and $PN_Q$) in order to evenly distribute the traffic load.

68. The remote station of claim 67 further comprising a transmitter that is coupled to the complex PN spreader, the transmitter configured to amplify, filter and upconvert the complex PN spread signal for transmission.

* * * * *